Figure 1:
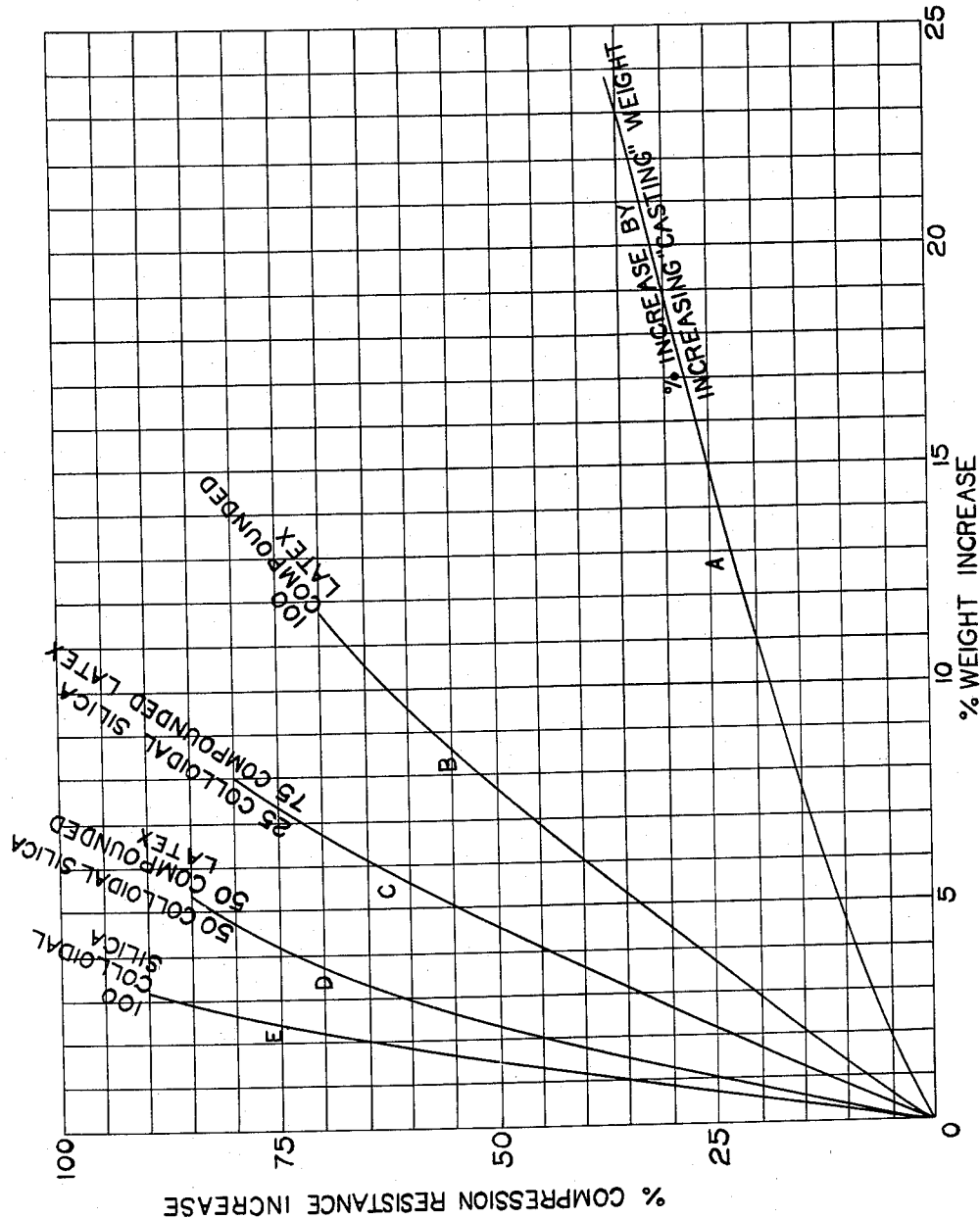

United States Patent Office 2,926,390
Patented Mar. 1, 1960

2,926,390

PROCESS OF IMPREGNATING VULCANIZED FOAM RUBBER WITH AN AQUEOUS DISPERSION COMPRISING COLLOIDAL SILICA

Anselm Talalay, New Haven, William D. Coffey, Shelton, and Joseph A. Talalay, New Haven, Conn., assignors, by direct and mesne assignments, of one-half to The B. F. Goodrich Company, a corporation of New York, and one-half to The Dayton Rubber Company, a corporation of Ohio Application July 25, 1956, Serial No. 600,015

19 Claims. (Cl. 18—53)

This invention relates to a process for making latex foam rubber and pertains more particularly to a method for making latex foam rubber wherein the vulcanized foam rubber is treated with an aqueous dispersion comprising colloidal silica to increase the compression resistance or load-bearing capacity of the foam rubber. This application is a continuation-in-part application of our application Serial No. 366,561, filed July 7, 1953.

In the commercial manufacture of foam rubber, a latex compounded with such materials as vulcanizing agents, accelerators and antioxidants is frothed either by mechanically entraining air in the latex or by causing the release of a gas within the latex. The frothed latex then is congealed or gelled by any of a variety of known ways and the congealed cellular mass is vulcanized, washed and dried. The resulting foam rubber has an open-cell structure (a structure which consists of a network of interconnecting cells), and is extensively used in the manufacture of pillows, seat cushions, mattresses and the like.

Foam rubber usually is graded according to its compression resistance which commercially is determined by measuring the force required to compress (with a circular disk 50 square inches in area) a foam rubber sample to 75 percent of its original height. (This method for determining the compression resistance of a foam rubber is described in "Buyers Specification-Latex Foam," issued by The Rubber Manufacturers Association, Inc., and in A.S.T.M. Specification designation D–1055). For most uses of foam rubber, it is desirable that the compression resistance of the foam rubber be as high as possible for a given unit of weight since the load-carrying capacity of a foam rubber is improved when the compression resistance of the foam rubber is increased.

The compression resistance of foam rubber largely is a function of its density and the modulus of elasticity of the polymer in the latex. It has been reported in the article by Joseph A. Talalay appearing in "Industrial and Engineering Chemistry," volume 46, pages 1530–1538 (1954), that the change in compression resistance of foam rubber with density can be expressed by the formula:

$$h = 4(1-\phi)^2/P$$

where $$\phi = (1 - G_f/0.034)^{1/3}$$

where $h$ is the force in pounds per square inch required to compress the foam rubber to 75 percent of its original height, $G_f$ is the density of the foam rubber in pounds per cubic inch, and P is a parameter in square inches per pound. It was found also that the compression resistance of foam rubber is affected somewhat by the size and shape of the cells of the foam rubber.

While the compression resistance of sponge rubber (expanded dry rubber) can be varied over a wide range by judiciously compounding the dry rubber with finely-divided reinforcing materials such as carbon blacks and fine particle clays, the properties of a rubber product formed directly from a latex can not be improved appreciably by the addition of compounding materials to the latex. Although a slight improvement in the compression resistance of a foam rubber can be obtained by adding moderate amounts of materials such as clays and hydrated alumina to the latex, other physical properties of the foam rubber usually are adversely affected by the addition of such materials to the latex. Consequently, improving the compression resistance of foam rubber by judicious compounding of the latex is unsatisfactory.

Figure 2:
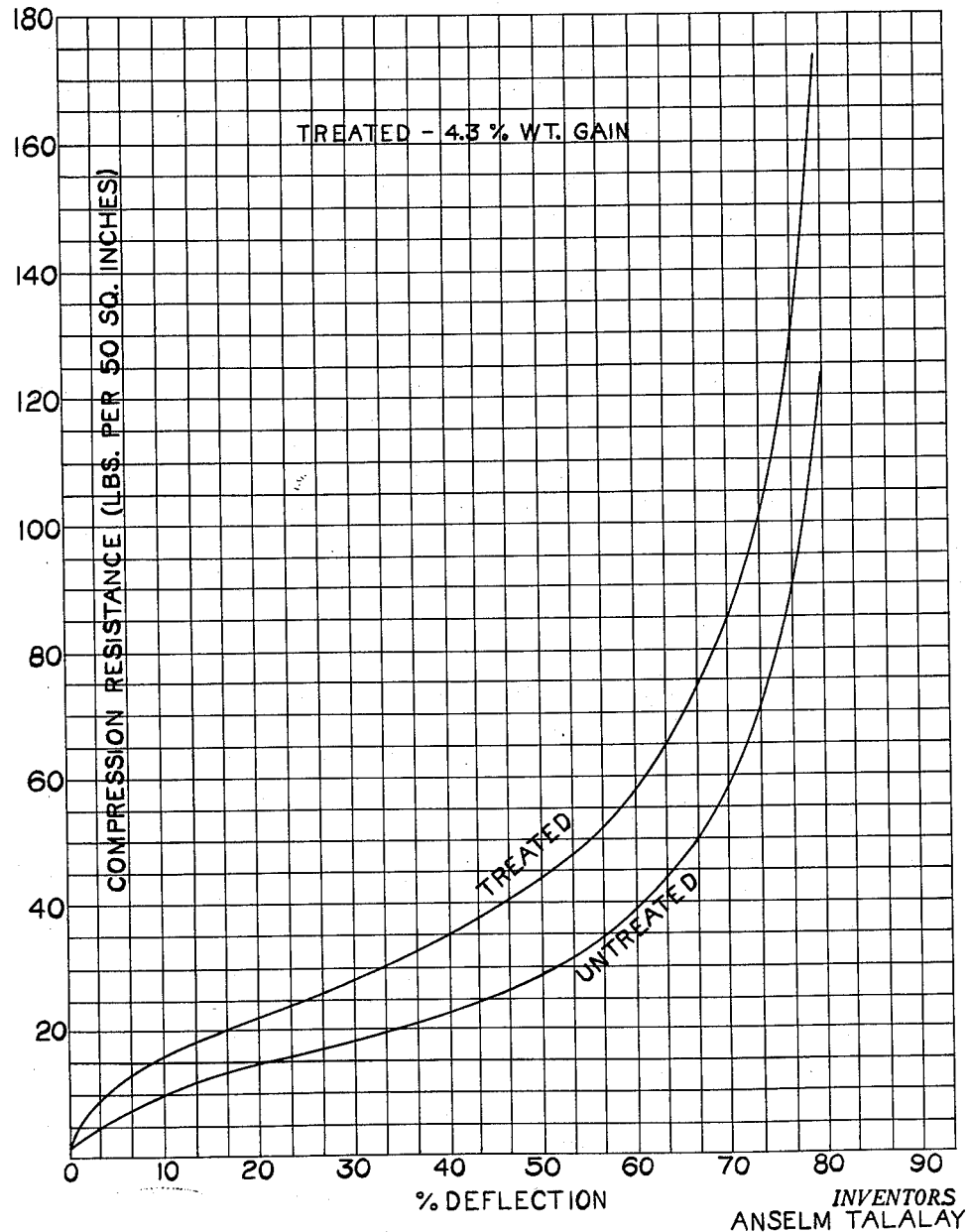

It now has been found that if a vulcanized open-cell foam rubber is impregnated with an aqueous dispersion or suspension comprising colloidal silica, the compression resistance of the dried foam rubber is unexpectedly increased while the other physical properties of the foam rubber are relatively unaffected. The effect of the treatment of a foam rubber with an aqueous colloidal silica dispersion is illustrated in the drawings in which:

Fig. 1 is a graph illustrating the increase in compression resistance obtained when a foam rubber is made in accordance with this invention; and Fig. 2 is a graph illustrating the improved compression resistance properties of a foam rubber made by the process of this invention as compared with a foam rubber which has not been treated with an aqueous colloidal silica dispersion as hereinafter described.

In accordance with the process of this invention, the latex is compounded in the usual manner with materials normally added to the latex to form a latex composition suitable for making foam rubber. The latex may be a natural rubber latex (which essentially is an aqueous dispersion of a polymer of isoprene), or a synthetic rubber latex, such as an aqueous dispersion of a rubbery polymer of an open-chain conjugated diolefin having from four to eight carbon atoms exemplified by butadiene-1,3; 1,4-dimethyl butadiene-1,3; 2,3-dimethyl butadiene-1,3, and the like, or of rubbery copolymers of such diolefins and similar conjugated diolefins with each other or with copolymerizable monomeric materials containing a single ethylenic linkage exemplified by styrene, methyl acrylate, methyl methacrylate, ethyl acrylate, ethyl methacrylate, acrylonitrile, or similar materials, or of rubbery polymers of chloroprene and the like, or a blend of a natural latex with a synthetic latex or a blend of synthetic lattices.

The compounded latex is frothed or foamed, for example, by mechanically entraining a non-coagulating gas such as air or nitrogen in the latex until the volume of the froth is sufficient to form a foam rubber of a desired density or by adding to the latex a gas-liberating material which decomposes in the latex or chemically reacts with another material in the latex with the evolution of a gaseous product in the latex, and the frothed or foamed latex is congealed or coagulated. Gelation of the frothed latex can be accomplished by adding a delayed action coagulant such as sodium silicofluoride, potassium silicofluoride, ammonium chloride or ammonium chloride or ammonium nitrate to the latex which causes the latex to gel within a relatively short and predeterminable time after it has been added to the latex, or by freezing the frothed or foamed latex and forcing a liquid or gas coagulant through the frozen latex as described in United States Patent 2,432,353. The congealed cellular mass is vulcanized in the usual manner, for example, by heating the coagulated latex in a mold or hot air oven at a vulcanizing temperature until the desired vulcanization is obtained. (It is apparent that in the manufacture of foam rubber by the process of this invention the steps of the process through the step of vulcanizing the coagulated cellular latex mass are the same as those normally employed heretofore in making foam rubber).

After vulcanization the foam rubber preferably is washed with water to remove water-soluble materials, such as soap, from the foam rubber before the foam rubber is treated with the aqueous colloidal silica dispersion. If the foam rubber has been coagulated by freezing the frothed latex and forcing a liquid or gas coagulant through the frozen latex as described in United States Patent 2,432,353, the foam rubber need not be dried before it is treated with the aqueous colloidal silica dispersion, but if gelation of the frothed latex is accomplished by using a delayed action coagulant, such as sodium silicofluoride, the vulcanized foam rubber should be dried in the usual manner before attempting treatment of the foam rubber with the aqueous colloidal silica dispersion.

The vulcanized foam rubber is treated with the aqueous colloidal silica dispersion by impregnating or permeating the foam rubber, preferably throughout its entire thickness, with the colloidal silica dispersion, for example, by immersing or dipping the foam rubber in a bath of the aqueous colloidal silica dispersion or by cascading or spraying the aqueous colloidal silica dispersion onto the foam rubber. The aqueous colloidal silica dispersion used in this invention is an aqueous dispersion comprising colloidal silica, commonly referred to as a silica sol, to which may be added other materials for modifying the foam rubber. The silica particles may not be present in the dispersion as anhydrous silicon dioxide but may be in a hydrated form associated with various proportions of water. Such dispersions frequently are stabilized with a small amount of alkali to prevent the precipitation of the silica in the form of a "gel." Colloidal silica dispersions may be made in a variety of well known ways, several processes for making such dispersions being described in United States Patent 2,574,902.

The aqueous colloidal silica dispersion desirably comprises about .5 to 30 percent by weight colloidal silica, a dispersion having a silica content of about .5 to 20 percent by weight being preferred. Preferably substantially all of the silica particles in the dispersion have a particle size under 300 millimicrons and best results are obtained when the silica particles of the dispersion have an average particle size of less than about 25 millimicrons and when the range of different size silica particles is relatively narrow. An aqueous dispersion of colloidal silica produced according to United States Patent 2,574,902 has been found to be particularly satisfactory for use in this invention.

After the foam rubber has been treated with the colloidal silica dispersion, the foam rubber preferably is passed between pressure rolls to squeeze excess colloidal silica dispersion from the foam rubber, and the foam rubber then is dried in the usual manner such as in an air oven.

The foam rubber treated with the colloidal silica dispersion in the above-described manner has a much higher compression resistance as compared to the same foam rubber which has not been so treated. Other physical properties of the treated foam rubber are essentially unchanged. The reason for the increase in compression resistance of the foam rubber is not understood.

If desired, a latex may be included in the aqueous colloidal silica dispersion, although preferably the solids content of the latex does not constitute more than about 10 percent by weight of the aqueous colloidal silica dispersion used for treating the foam rubber. Any natural or synthetic latices or blends thereof can be used for this purpose and the latex should be compounded in the usual manner before being added to the dispersion. The addition of a small amount of mono-ethyl amine to the latex (one part by weight per 100 parts by weight of latex usually being sufficient) prevents the formation of "floc" when the latex is added to the dispersion. The dispersion should be well agitated to prevent materials compounded with the latex from "settling out" and to insure that objectionable flocculation of the latex does not occur in the dispersion.

The invention is illustrated by the following examples.

*Example 1*

Flat, cored, open-cell foam rubber automobile topper pads (used as a topping material over a spring frame for an automobile seat) about one and one-quarter inches thick were formed by the "freeze-coagulation" process described in United States Patent 2,432,353 from a blend of latices containing equal proportions of a natural rubber latex and a high solids butadiene-styrene latex (GR–S type No. X–667). The vulcanized topper pads were washed in the usual manner to remove water-soluble materials such as soap from the foam rubber. The undried, washed topper pads were immersed in aqueous colloidal silica dispersions of varying colloidal silica content, conveyed between squeeze rolls and then dried in a circulating hot air oven. The compression resistance of the topper pads (when compressed to 75 percent of their original height) and the weight of the colloidal silica treated topper pads was determined and compared with the compression resistance and weight of topper pads which had not been treated with a colloidal silica dispersion. The compression resistance of the colloidal silica treated topper pads was much superior to that of the untreated topper pads. The relationship between percent increase in compression resistance of the topper pads and the percent increase in weight of the topper pads is shown by curve E of Fig. 1.

*Example 2*

Topper pads were formed and evaluated as in Example 1 except that the topper pads were immersed in aqueous colloidal silica dispersions containing a compounded butadiene-styrene latex (GR–S type No. X–667), the ratio of silica to latex solids being 50:50. The latex added to the aqueous dispersions of colloidal silica had the following composition:

| Material | Parts by Weight |
|---|---|
| Butadiene-styrene latex (GR–S type No. X–667) | 100.0 |
| Potassium oleate | 2.0 |
| Mono ethylamine | 1.00 |
| Styrenated phenol ("Wingstay S" antioxidant) | 1.50 |
| Zinc oxide | 4.00 |
| Zinc diethyl dithiocarbamate | 1.25 |
| Zinc mercaptobenzothiazole | 1.25 |
| Sulfur | 2.25 |

The relationship between the percent increase in compression resistance and the percent increase in weight of the topper pads formed in accordance with this example is shown by curve D of Fig. 1.

Example 3

Topper pads were formed and evaluated as in Example 2 except that the ratio of silica to latex solids in the dispersions was 25:75. The relationship between the percent increase in compression resistance and the percent increase in weight of the topper pads formed in accordance with this example is shown by curve C of Fig. 1.

Topper pads formed as in Example 1 except that they were treated with aqueous dispersions of the compounded butadiene-styrene latex used in the immersion dispersions of Examples 2 and 3 instead of colloidal silica dispersions, the latex being diluted with water to varying concentrations, also were evaluated. The relationship between the percent increase in compression resistance and the percent increase in weight of the topper pads treated with the diluted latex is shown by curve B in Fig. 1.

Curve A of Fig. 1 shows the percent increase in compression resistance of topper pads (compressed to 75 percent of original height) obtained by increasing the density of the foam rubber of the topper pads.

Referring to Fig. 1, it is apparent that the treatment of foam rubber with an aqueous colloidal silica dispersion greatly improved the compression resistance of the foam rubber and that the increase in compression resistance is not due merely to an increase in density (weight) of the foam rubber since the improvement in compression resistance realized is much greater than would occur by merely increasing the density of the foam rubber.

It has been found that the compression resistance of the foam rubber can be increased further by repeated impregnations of the foam rubber with an aqueous colloidal silica dispersion, as illustrated by the following example, although the percentage increase in compression resistance on successive dips may not be as great as obtained with the initial treatment.

Example 4

Samples of an open-cell foam rubber automobile door weatherstrip were immersed in an aqueous colloidal silica dispersion (10 percent by weight total solids) containing a compounded butadiene-styrene latex (GR-S type No. X-667), the ratio of silica to latex solids in the dispersion being 50:50, and then were passed through squeeze rolls and dried for 15 minutes at 210° F. The samples were immersed, squeezed and dried a second and third time. The samples exhibited a weight increase of 7.6 percent and an increase in compression resistance of 27.4 percent after they had been immersed, squeezed and dried once, and a weight increase of 21.1 percent and an increase in compression resistance of 94.2 percent after being immersed, squeezed and dried a third time (the compression resistance was measured by determining the force in pounds required to compress the thickness of a 12 inch length of the weatherstrip under an initial load of one pound a distance of ⅛ inch).

The compression resistance of a foam rubber treated with an aqueous colloidal silica dispersion varies with the amount of compression (deflection) in a manner similar to that of a foam rubber which has not been treated with a colloidal silica dispersion, except that the compression resistance of the colloidal silica treated foam rubber is greater than that of the untreated foam rubber, as illustrated by the following example.

Example 5

The compression resistance of an untreated cored open-cell foam rubber utility slab, 3¼ inches thick, was measured at increments of 10 percent deflection of the original height of the slab, see Fig. 2 (untreated), the same slab of foam rubber then was immersed in an aqueous colloidal silica dispersion (10 percent total solids) containing a compounded butadiene-styrene latex (GR-S type No. X-667), squeezed and dried, and the compression resistance of the treated slab was measured for the same increments of deflection as the untreated foam rubber, see Fig. 2 (treated). Referring to Fig. 2, it is seen that the curve for the treated foam rubber slab is quite similar in shape to the curve for the untreated foam rubber slab.

The percent increase in weight of the treated slab was 4.3 percent and the present increase in compression resistance of the treated foam rubber as compared to the untreated foam rubber at the increments of deflection at which compression resistances were determined are as follows:

| Percent Deflection | Percent Increase in Compression Resistance |
|---|---|
| 10 | 56 |
| 20 | 56 |
| 30 | 56 |
| 40 | 56 |
| 50 | 54 |
| 60 | 51 |
| 70 | 47 |
| 80 | 41 |

As illustrated above and as shown in Fig. 2, the compression resistance of the treated foam rubber is greater than the compression resistance of the untreated foam rubber through at least a deflection of 80 percent, which is close to the "bottoming condition" of foam rubber, although it might be expected that the treatment of foam rubber with colloidal silica would only be effective in the lower deflection range of 10 to 50 percent deflection where the rigidity of the cell walls of the foam rubber would be a major factor contributing to the compression resistance.

It is clear that many modifications and variations of this invention may be made without departing from the spirit and scope of the appended claims.

We claim:

1. A process for making an open-cell foam rubber comprising foaming a latex, congealing the foamed latex, vulcanizing the congealed cellular mass to form an open-cell foam rubber, and impregnating the vulcanized foam rubber with an aqueous dispersion comprising colloidal silica.

2. A process for making an open-cell foam rubber comprising foaming a latex, congealing the foamed latex with a delay action coagulant, vulcanizing the congealed cellular mass to form an open-cell foam rubber, drying the foam rubber, and impregnating the dried vulcanized foam rubber with an aqueous dispersion comprising colloidal silica.

3. A process for making an open-cell foam rubber comprising foaming a latex, congealing the foamed latex with a delay action coagulant, vulcanizing the congealed cellular mass to form an open-cell foam rubber, washing the foam rubber to remove water-soluble materials from the foam rubber, drying the washed foam rubber, and impregnating the dried vulcanized foam rubber with an aqueous dispersion comprising colloidal silica.

4. A process for making an open-cell foam rubber comprising foaming a latex, congealing the foamed latex with a delayed action coagulant, vulcanizing the congealed cellular mass to form an open-cell foam rubber, washing the foam rubber to remove water-soluble materials from the foam rubber, drying the washed foam rubber, impregnating the dried vulcanized foam rubber with an aqueous dispersion comprising about .5 to 30 percent by weight colloidal silica, squeezing the foam rubber to remove any excess aqueous colloidal silica dispersion from the foam rubber, and drying the foam rubber.

5. A process for making an open-cell foam rubber comprising foaming a latex, congealing the foamed latex with a delayed action coagulant, vulcanizing the congealed cellular mass to form an open-cell foam rubber, washing the foam rubber to remove water-soluble materials from the foam rubber, drying the washed foam rubber, impregnating the dried vulcanized foam rubber with an aqueous dispersion comprising about .5 to 20 percent by weight colloidal silica, squeezing the foam rubber to remove any excess aqueous colloidal silica dispersion from the foam rubber, and drying the foam rubber.

6. A process for making an open-cell foam rubber comprising foaming a latex, congealing the foamed latex with a delay action coagulant, vulcanizing the congealed cellular mass to form an open-cell foam rubber, washing the foam rubber to remove water-soluble materials from the foam rubber, drying the washed foam rubber, impregnating the dried vulcanized foam rubber with an aqueous dispersion comprising about .5 to 30 percent by weight colloidal silica, substantially all of the colloidal silica in the aqueous colloidal silica dispersion having a particle size under 300 millimicrons, squeezing the foam rubber to remove any excess aqueous colloidal silica dispersion from the foam rubber, and drying the foam rubber.

7. A process for making an open-cell foam rubber comprising foaming a latex, congealing the foamed latex with a delayed action coagulant, vulcanizing the congealed cellular mass to form an open-cell foam rubber, washing the foam rubber to remove water-soluble materials from the foam rubber, drying the washed foam rubber, impregnating the dried vulcanized foam rubber with an aqueous dispersion comprising about .5 to 30 percent by weight colloidal silica, the average particle size of colloidal silica in the aqueous colloidal silica dispersion being less than about 25 millimicrons and substantially all of the colloidal silica in the aqueous colloidal silica dispersion having a particle size under 300 millimicrons, squeezing the foam rubber to remove any excess aqueous colloidal silica dispersion from the foam rubber, and drying the foam rubber.

8. A process for making an open-cell foam rubber comprising foaming a latex, congealing the foamed latex by freezing it and then passing a fluid coagulant through the frozen cellular mass, vulcanzing the congealed cellular mass to form an open-cell foam rubber, and impregnating the vulcanized foam rubber with an aqueous dispersion comprising colloidal silica.

9. A process for making an open-cell foam rubber comprising foaming a latex, congealing the foamed latex by freezing it and then passing a fluid coagulant through the frozen cellular mass, vulcanizing the congealed cellular mass to form an open-cell foam rubber, washing the foam rubber to remove water-soluble materials from the foam rubber, drying the foam rubber, and impregnating the dried vulcanized foam rubber with an aqueous dispersion comprising colloidal silica.

10. A process for making an open-cell foam rubber comprising foaming a latex, congealing the foamed latex by freezing it and then passing a fluid coagulant through the frozen cellular mass, vulcanizing the congealed cellular mass to form an open-cell foam rubber, washing the foam rubber to remove water-soluble materials from the foam rubber, and impregnating the washed vulcanized foam rubber with an aqueous dispersion comprising colloidal silica.

11. A process for making an open-cell foam rubber comprising foaming a latex, congealing the foamed latex by freezing it and then passing a fluid coagulant through the frozen cellular mass, vulcanizing the congealed cellular mass to form an open-cell foam rubber, washing the foam rubber to remove water-soluble materials from the foam rubber, impregnating the washed vulcanized foam rubber with an aqueous dispersion comprising about .5 to 30 percent by weight colloidal silica, squeezing the foam rubber to remove any excess aqueous colloidal silica dispersion from the foam rubber, and drying the foam rubber.

12. A process for making an open-cell foam rubber comprising foaming a latex, congealing the foamed latex by freezing it and then passing a fluid coagulant through the frozen cellular mass, vulcanizing the congealed cellular mass to form an open-cell foam rubber, washing the foam rubber to remove water-soluble materials from the foam rubber, impregnating the washed vulcanized foam rubber with an aqueous dispersion comprising about .5 to 20 percent by weight colloidal silica, squeezing the foam rubber to remove any excess aqueous colloidal silica dispersion from the foam rubber, and drying the foam rubber.

13. A process for making an open-cell foam rubber comprising foaming a latex, congealing the foamed latex by freezing it and then passing a fluid coagulant through the frozen cellular mass, vulcanizing the congealed cellular mass to form an open-cell foam rubber, washing the foam rubber to remove water-soluble materials from the foam rubber, impregnating the washed vulcanized foam rubber with an aqueous dispersion comprising about .5 to 30 percent by weight colloidal silica, substantially all of the colloidal silica in the aqueous colloidal silica dispersion having a particle size under 300 millimicrons, squeezing the foam rubber to remove any excess aqueous colloidal silica dispersion from the foam rubber, and drying the foam rubber.

14. A process for making an open-cell foam rubber comprising foaming a latex, congealing the foamed latex by freezing it and then passing a fluid coagulant through the frozen cellular mass, vulcanizing the congealed cellular mass to form an open-cell foam rubber, washing the foam rubber to remove water-soluble materials from the foam rubber, impregnating the washed vulcanized foam rubber with an aqueous dispersion comprising about .5 to 30 percent by weight colloidal silica, the average particle size of colloidal silica in the aqueous colloidal silica dispersion being less than about 25 millimicrons and substantially all of the colloidal silica in the aqueous colloidal silica dispersion having a particle size under 300 millimicrons, squeezing the foam rubber to remove any excess aqueous colloidal silica dispersion from the foam rubber, and drying the foam rubber.

15. A process for making an open-cell foam rubber comprising foaming a latex, congealing the foamed latex, vulcanizing the congealed cellular mass to form an open-cell foam rubber, and impregnating the vulcanized foam rubber with an aqueous dispersion comprising colloidal silica and a latex.

16. A process for making an open-cell foam rubber comprising foaming a latex, congealing the foamed latex with a delayed action coagulant, vulcanizing the congealed cellular mass to form an open-cell foam rubber, drying the foam rubber, and impregnating the dried vulcanized foam rubber with an aqueous dispersion comprising colloidal silica and a latex.

17. A process for making an open-cell foam rubber comprising foaming a latex, congealing the foamed latex with a delayed action coagulant, vulcanizing the congealed cellular mass to form an open-cell foam-rubber, drying the foam rubber, impregnating the dried vulcanized foam rubber with an aqueous dispersion comprising colloidal silica and a latex, said aqueous dispersion containing about .5 to 30 percent by weight colloidal silica and less than about 10 percent by weight latex solids.

18. A process for making an open-cell foam rubber comprising foaming a latex, congealing the foamed latex by freezing it and then passing a fluid coagulant through the frozen cellular mass, vulcanizing the congealed cellular mass to form an open-cell foam rubber, and impregnating the vulcanized foam rubber with an aqueous dispersion comprising colloidal silica and a latex.

19. A process for making an open-cell foam rubber comprising foaming a latex, congealing the foamed latex by freezing it and then passing a fluid coagulant through the frozen cellular mass, vulcanizing the congealed cellular mass to form an open-cell foam rubber, and impregnating the vulcanized foam rubber with an aqueous dispersion comprising colloidal silica and a latex, said aqueous dispersion comprising about .5 to 30 percent by weight colloidal silica and less than about 10 percent by weight latex solids.

References Cited in the file of this patent

UNITED STATES PATENTS

| | | |
|---|---|---|
| 2,200,850 | Miserentino | May 14, 1940 |
| 2,432,353 | Talalay | Dec. 9, 1947 |
| 2,711,977 | Butsch | June 28, 1955 |
| 2,760,941 | Iler et al. | Aug. 28, 1956 |

UNITED STATES PATENT OFFICE
CERTIFICATE OF CORRECTION

March 1, 1960

Patent No. 2,926,390

Anselm Talalay et al.

It is hereby certified that error appears in the printed specification of the above numbered patent requiring correction and that the said Letters Patent should read as corrected below.

Column 1, line 59, the formula should appear as shown below instead of as in the patent:

$$h = 4(1 - \theta)^2 / P$$

column 3, line 3, strike out "ammonium chloride or"; column 5, line 25, for "improved" read -- improves --; column 6, line 59, and column 7, line 16, for "delay", each occurrence, read -- delayed --.

Signed and sealed this 4th day of October 1960.

(SEAL)
Attest:

KARL H. AXLINE
Attesting Officer

ROBERT C. WATSON
Commissioner of Patents